United States Patent [19]

Shearon

[11] 4,041,816

[45] Aug. 16, 1977

[54] ROTARY WEB CHOPPER

[75] Inventor: Michael Hillas Shearon, Newark, Del.

[73] Assignee: E. I. Du Pont de Nemours and Company, Wilmington, Del.

[21] Appl. No.: 713,807

[22] Filed: Aug. 12, 1976

Related U.S. Application Data

[63] Continuation-in-part of Ser. No. 689,557, May 24, 1976, which is a continuation of Ser. No. 616,055, Sept. 23, 1975, abandoned.

[51] Int. Cl.[2] ......................... B23D 25/12; B26D 7/06

[52] U.S. Cl. ........................................ 83/100; 83/345; 83/674

[58] Field of Search ...................... 83/355, 356.3, 345, 83/674, 694, 594, 595, 98, 100, 99, 349

[56] References Cited

U.S. PATENT DOCUMENTS

| | | | |
|---|---|---|---|
| 2,246,957 | 6/1941 | Shields | 83/345 X |
| 3,220,293 | 11/1965 | Barber | 83/345 |
| 3,338,575 | 8/1967 | Nystrand et al. | 83/100 |
| 3,703,841 | 11/1972 | Crawford | 83/345 X |

*Primary Examiner*—Willie G. Abercrombie

[57] ABSTRACT

An apparatus for the high-speed transverse severing of sheets from a running web utilizing interacting blades carried by counter-rotating shafts, with wrap around and retention of the web on one shaft. The blade on the other shaft has a shaped surface which defines an epitrochoid profile along its entire length. The blade on the one shaft has a straight cutting edge which accurately engages an opposed cutting edge defined by the intersection of said shaped surface and the outer peripheral surface of said blade.

20 Claims, 17 Drawing Figures

Fig. 3.
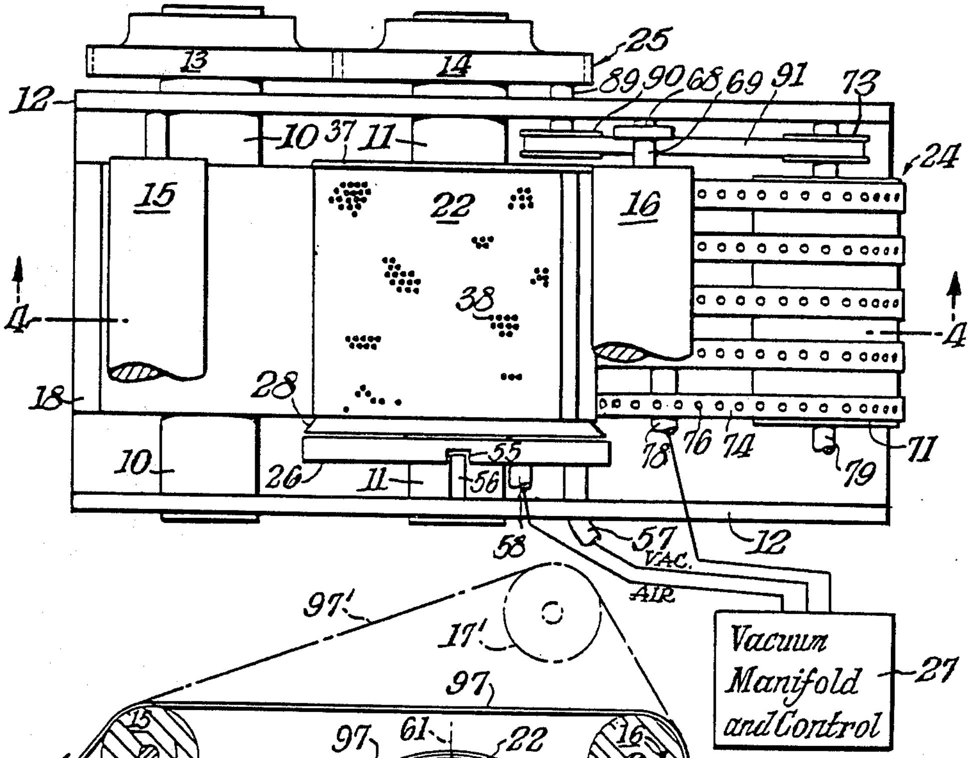
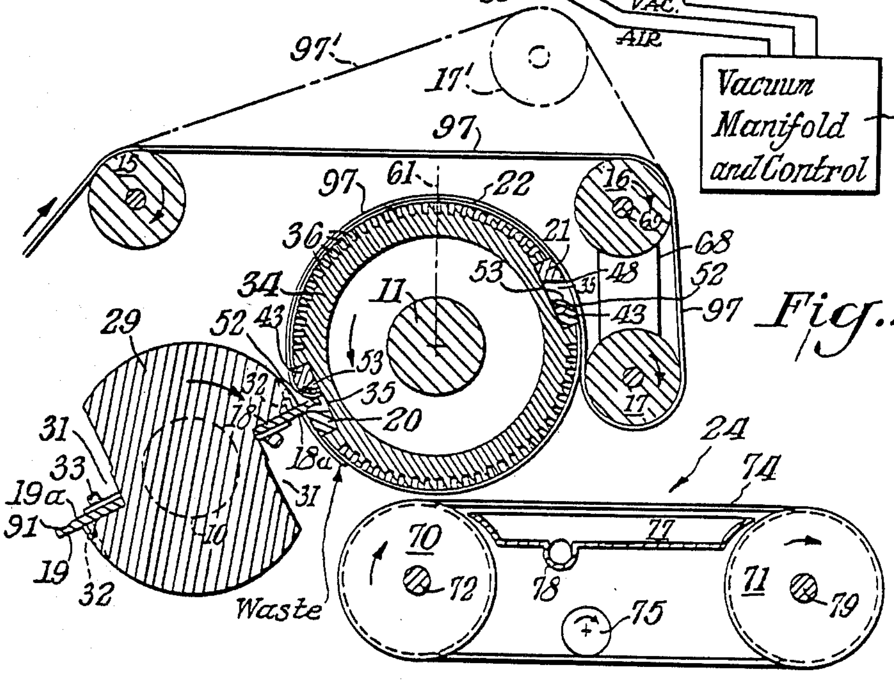
Fig. 4.

Fig. 7.
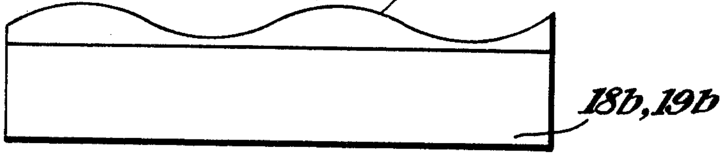
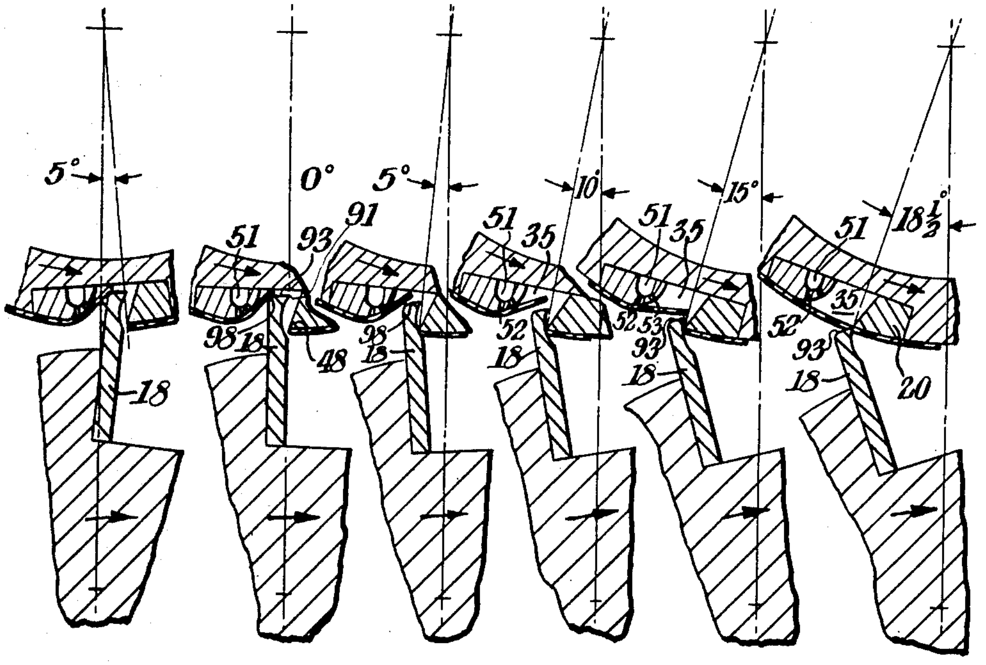
Fig. 8f. Fig. 8e. Fig. 8d. Fig. 8c. Fig. 8b. Fig. 8a.

ROTARY WEB CHOPPER

CROSS REFERENCE TO RELATED APPLICATIONS

This application is a continuation-in-part of pending U.S. Ser. No. 689,557 filed May 24, 1976 which is a continuation of U.S. Ser. No. 616,055 filed Sept. 23, 1975 now abandoned.

BACKGROUND OF THE INVENTION

This invention relates to a cutting apparatus and more particularly, to an apparatus capable of cutting a running web accurately even at high speeds.

Numerous devices have been contrived over the years for cutting running webs of material. Many of these devices have involved, power-driven, counter-rotating opposed drums each provided with co-acting blades which sever the web.

Where constant angular velocity of the rotating components is maintained, it is possible to obtain a relatively uniform cut length of successive sheets. However, mechanical roll drives inevitably have clearance or slack at various point that contribute mechanical backlash. When such blacklash is combined with shaft twisting and other structural deformations, the result is instantaneous velocity differences at the blade tips which, in turn, gives differences in sheet length of as much as $\pm$ 1 mm. For many applications these differences are excessive. These differences are influenced by web dynamics, e.g., web flutter and the like, which account for part of the length variation. The effect of web dynamics increases when high web speeds of, for example, 50 meters/min. or higher, are attempted.

Apart from these length variations, a problem is often encountered with blade life which in some cases can be so short as to require a readjustment and resharpening of the blades virtually with every change of a factory shift. A still further problem encountered with the cutting apparatus of the prior art is that it is prone to breakdown due to the extreme speeds and forces to which it is subjected. This is particularly true when tough materials such as some of the sheet plastics used in photographic film making are to be cut.

Among the various prior art apparatus that is known and been found unsatisfactory is a rotary shear knife designed by W. W. McFarren. This shear knife is described in U.S. Pat. No. 2,125,939 issued Aug. 9, 1938 and involves two counter-rotating shafts each mounting tapered blades each having an involute shaped cross-section along the length of the blade. This arrangment is subject to all of the problems noted above such as length variation of the cut pieces and, in addition, because of the involute shaped blades, the web cannot be cut at right angles. A final problem is encountered because the involute shaped itself causes excessive wear of the blades — hence the requirement for frequent resharpening. A final problem is due to the dynamics of the cutting operation; the blades themselves tend to scrape along the surface of the film that is cut. This is disadvantageous particularly in the case of highly sensitive photographic films which would tend to become scratched under such rough treatment.

A greatly improved cutter was designed by Shields and described in his U.S. Pat. No. 2,246,957 issued June 24, 1941. Shields does not solve the accurate cutting length problem, but he does bend or shape the blades along their respective lengths such that the cutting edge of one of the blades approximates an epitrochoid curve while the other blade is parallel to the axis. Because of the taper of the blade edge, the actual cut is a progressive shearing action. Unfortunately, despite the significant improvement provided by Shields, the bending of the long blade is at best somewhat inaccurate and requires tedious adjustments to even closely approximate an edge following a true epitrochoid curve. Once this is accomplished, the slightest jar or nick in the edge of the blade will produce a gap and often destroy the epitrochoid curve of the edge. This is totally unsatisfactory particularly if precise cuts are required. Furthermore, once a blade is resharpened the entire alignment of the blade must be readjusted.

Huck describes in his U.S. Pat. No. 2,738,842 issued Mar. 20, 1946, a technique whereby the web to be cut is wrapped around one drum which mounts a straight edge blade parallel to the axis of the drum. This permits accurate lengths to be cut. Furthermore, once the cut is achieved the front edge of the cut is clamped such that it is firmly secured to the drum so that it may more accurately meter the next section of web to be cut as the drum rotates. Despite these improvements, Huck combines an involute shaped blade with a straight edge which creates an inherent mismatch. He makes up to a large extent for this mismatch by the utilization of a spring-loaded blade which co-acts with the involute shaped blade. The spring loading, in and of itself, however, means that extremely tough materials cannot under any conditions be cut with the desired degree of reliability. Furthermore the mechanical clamping arrangement is at best somewhat tedious and prone to breakdown and does not lend itself to high speed operation.

A significant improvement over the mechanical clamping arrangement is taught by Nystrand et al. in their U.S. Pat. No. 3,338,575 issued Aug. 29, 1967. Nystrand et al. describe a valved vacuum retention technique in which the leading edge as well as the trailing edge of the webs are maintained by a plurality of vacuum holes disposed over the periphery of the drum around which the web is wrapped for metering purposes. Trogan, in his U.S. Pat. No. 3,709,077 issued Jan. 9, 1973, improves on the vacuum hold down techniques by providing a slight recess in the periphery of the drum with a vacuum port such that as the cut occurs, the film is tucked into the recess and held there tightly and securely by the vacuum until subsequently released at the proper portion of the web cycle by a suitable vacuum valving arrangement.

Unfortunately, all of this prior art suffers from unreliability, repeated failure and the requirement of the blades be frequently sharpened, each sharpening necessitating a complete readjustment of the alignment of the respective blades. It is an object of this invention, therefore, to obviate many of these disadvantages of the prior art cutting apparatuses.

BRIEF SUMMARY OF THE INVENTION

This invention involves a cutter for a running web that includes first and second axially, co-parallel counter-rotating shafts driven in synchronism one with the other, a first blade mounted on said first shaft and having a straight cutting edge parallel to the axis thereof, a second blade mounted on said second shaft and having a shaped surface defined by generatrices parallel to the axis of said second shaft with the locus of said generatrices being an epitrochoid, said second blade having an outer peripheral surface forming with said shaped surface a second cutting edge, and said blades co-acting along their opposed cutting edges to effect a cut on a web therebetween.

In preferred embodiments of the invention the second cutting edge is non-parallel to the second shaft axis and in a particularly preferred embodiment lies in a plane and is tapered along its full length relative to the second shaft axis. Furthermore, each of the shafts have an equivalent pitch radius and the radial distance of the first blade cutting edge from the axis of the first shaft is greater than the equivalent pitch radius of the first shaft. The first blade is located in an axial recess on the periphery of the first shaft such that its cutting edge is located near the outside periphery thereof. The first shaft includes retention means for retaining the web on a portion of the periphery of the first shaft at least up to the point of web severance. In a preferred embodiment the retention means includes vacuum ports selectively valved to retain and release the web.

With this arrangement a cutter is provided having a long life and which, becase of the unique design of the shaped surface, is self-sharpening to the extent that it may be sharpened without readjustment, nicks tend to be worked out during use and do not significantly affect the quality of the cut. The wrap around metering permits an extremely high degree of accuracy of cut.

DESCRIPTION OF THE DRAWINGS

Further advantages and features of this invention will become apparent upon consideration of the following description wherein:

FIG. 3 is a plan view of the apparatus of FIG. 1 diagrammatically depicting the vacuum control;

FIG. 4 is a cross sectional, elevation view of the cutter depicted in FIG. 3 taken along the section lines 4—4 particularly illustrating the cutter in operation with a web in position in the process of being cut;

FIG. 7 is a front elevational view of an alternative embodiment of the same blade depicted in FIG. 6;

FIGS. 8A–8F are fragmentary cross-sectional views of the interacting cutter blades showing in progression, the initiation, continuation and termination of a single web cut;

DETAILED DESCRIPTION OF THE PREFERRED EMBODIMENTS

Figure 1:
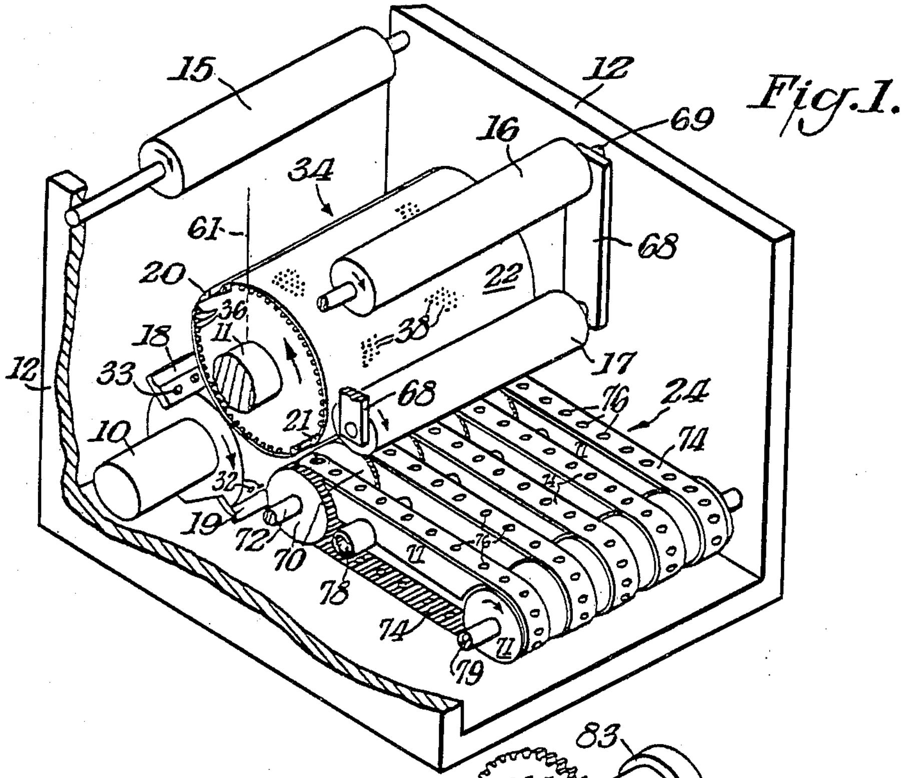
FIG. 1 is an isometric view, partly in cross-section, of a first preferred embodiment of apparatus constructed in accordance with this invention.

Referring to FIGS. 1 to 4, a first preferred embodiment of apparatus constructed according to this invention generally comprises a frame 12. A pair of parallel shafts 10, 11 which are adapted to be driven in synchronism but in opposite senses of rotation, i.e., the shafts are counter-rotating, by gears 13, 14, respectively, may be journaled in ball bearings (not shown), in the frame 12. This embodiment further comprises a plurality of shaped or locus web cutting blades 18, 19 carried by the lower (in the drawing) or locus blade 10, an upper web retention or metering roll 34 on the upper (in the drawing) or straight blade shaft 11, a plurality of straight web cutting blades 20, 21 on the upper web carrying roll 34, a timing valve plate 26 (FIG. 3), web guide rolls 15, 16 and 17 carried by the frame 12, a belt conveyor 24 and a drive 25, all hereinafter described in greater detail. While plural blades are depicted, it is understood that a single blade may be mounted on either or both shafts.

Shafts and Cutter Blades

Referring to FIG. 4, the lower shaft 10, which is arranged for clockwise rotation, has an integral body 29 which, in this embodiment, has two machined recesses 31 parallel to the shaft axis of rotation and located on opposite sides of the body 29. These are provided to receive the individual locus cutting blades 18 and 19. The latter may each be made of a block of tool steel, a chromium cobolt alloy such as that sold under the tradename Stellite, or other suitable material which extends for the full length of body 29, being secured by a plurality of socket head cap screws 33 set at an angle to urge the blade firmly into a corner of the recess 31. The ends of the blades 18, 19 extend radially outside body 29 and are specially shaped or profiled on their leading faces 18*a* and 19*a*, as hereinafter described.

Figure 2:
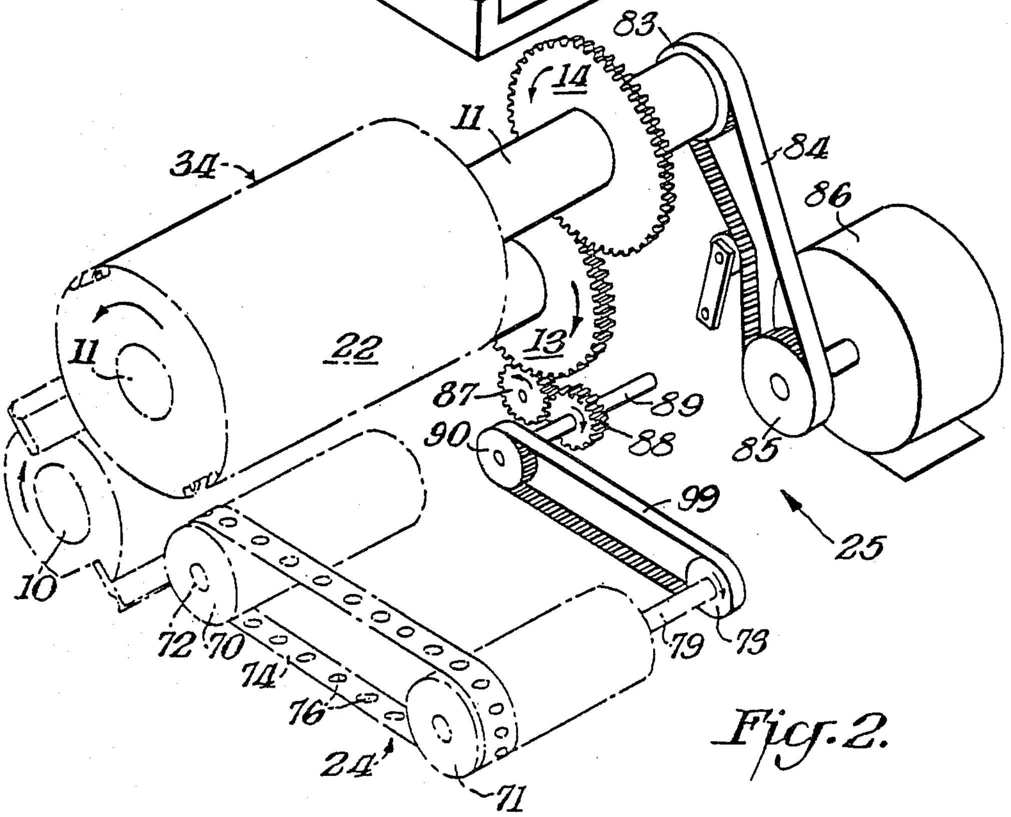
FIG. 2 is a diagrammatic view of the power drive for the apparatus of FIG. 1.

The web roll 34, FIGS. 1, 2 and 4 is integral with its shaft 11 and has a roll face defined by a shell 22 which, as will be described, has substantially the same length as the body 29 of lower shaft 10. Machined into the surface of the roll 34 in the axial direction are two recesses 35 (180° apart for equi-length sheets) and a plurality of longitudinal shallow grooves 36 equally spaced which extend end-to-end of the face of roll 34 and occupy the entire cylindrical portion except where the recesses 35 are located. These grooves, as will be described, act as web retention means and when vacuum is applied hold the web securely against the upper roll 34. It should be understood that the web retention and release mechanism described herein is merely illustrative of one way of selectively holding the web against the roll 34. A vacuum web retention system is described, for example, by Nystrand et al. Other web retention means may also be used. For example, mechanical fingers such as described by Huck may be used. The function of the web retention roll 34 is to accurately meter the lengths of web that are to be cut.

To complete a brief description of the pneumatic web retention and release system illustrated, one end of the roll has a thin circular plate 37, secured by screws, to close off the ends of the grooves 36. The outer periphery of roll 34, save for the recesses 35, is covered entirely by a thin shell 22, typically about 0.2 cm thick, which is secured to the cylindrical surface of the roll 34, e.g., by brazing. The shell 22 has a plurality of air ports of holes 38 aligned in axial rows spaced in the roll axial direction directly over each of the grooves 36.

Penumatic Control

Vacuum or air pressure is selectively applied to the several vacuum ports 38 by any suitable known mechanism. For example, vacuum or air under pressure may be applied to the several ports 38 and other areas of the system by timed valving controlled by a vacuum manifold and control depicted by the block 27 (FIG. 3). Alternatively this may be accomplished mechanically by say a timing valve plate 26, (FIG. 3) and valve plate 28 similar to that described by Nystrand et al. Such a plate 26 may comprise a stationary plate having arcuate slots (not shown) of appropriate radius and arcuate length to supply vacuum 57 or air pressure 58 during selected portions of rotation of the roll 34 to various surface regions. The plate 26 is in sliding face to face contact with a valve plate 28 (FIG. 3) having communicating ports which selectively interconnect the plate 26 with the slots 36 (and 51). The valve plate 28 is secured to the end face of the upper roll 34. The particular system used for applying vacuum or air pressure is immaterial and does not constitute a part of this invention.

Shaft Recess

Figure 9:
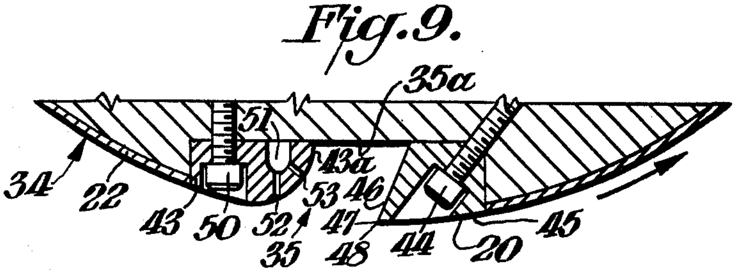
FIG. 9 is an enlarged fragmentary cross-section of a straight blade recess of the apparatus of FIG. 1, showing the blade and the associated vacuum and pressure web leading edge appurtenance.

Returning to the web retention roll 34 this is intended for counterclockwise rotation. The leading end of each recess 35 of the roll is occupied by a tool steel blade 20 (or 21), respectively, while the lagging end of each recess is occupied by a quarter round member 43. Preferably the straight blades 20 (21) are of a harder material, such as tungsten carbide, than the locus blades 18, 19. Each blade 20, (or 21), shown best in FIG. 9, comprises a bar extending the full length of the roll 34, secured to the roll by a plurality of screws 44 angled so as to drive the blade firmly into the leading 90° corner of the recess 35. In a preferred embodiment the outer profile 45 (FIG. 9) of each straight blade 20, 21 is machined to a radius substantially identical with that of the outside periphery of the roll shell 22, while the exposed blade surface 46 disposed within the recess 35 is angled at 25° (measured in the direction of roll rotation) relative to a roll 34 radius, so that the blade, measured chordally, is wider at the outer surface 45 than at its juncture with the bottom of the recess 35. This ensures that portions of the straight blade 20 (21) other than the cutting edge will not touch the locus blades 18 (19). At the intersection of the exposed blade surface 46 and the radiused surface 45 the blade may have extremely narrow flat 47 disposed at 90° to a tangent to surface 45. Blade 20, 21 should present a flawless "dead sharp" edge 48 (or corner) at its intersection with the outer peripheral or radiused surface 45. This edge 48 is a straight line, extends for the full axial face width of the roll, desirably should lie in the roll outer cylindrical surface and be parallel to the axis of rotation of the roll 34, i.e., be in a radial plane. The edges 48 of the two blades 20, 21 are positioned 180° apart for equal sections. Other positions may be selected as desired.

In alternative embodiments where accurate metering of the lengths of the cuts is not needed, the blades 20 (21) and particularly the edge 48 may extend below or beyond the roll outer cylindrical surface.

Occupying the opposite or lagging side of each recess 35 is a manifold 51. This manifold may be formed by a quarter round member 43 spaced from the blade 20, 21 and secured by screws 50. The side 43*a* which faces toward surface 46 is profiled to form a quarter circle while the outer side has a radius substantially identical to and flush with that of the outside of the roll shell 22, the smaller and larger radii of member 43 being faired or blended into each other to form a smooth contour. In the bottom of the member 43 is a U-shaped manifold 51 extending the full length of the member 43. One end of the manifold 51 abuts the plate 37, and consequently, is closed, while the opposite end is aligned with and is open to appropriately located ports (not shown) in the valve plate 28. These ports selectively apply vacuum or pressurized air to the manifold 51 to retain and release the leading edge of a severed web section as will be described.

This is accomplished by parallel rows of holes 52 and 53 coparallel to the axis of roll 34 and extending practically the full length of the member 43 which are formed in the manifold 51.

As shown in FIGS. 1 and 4, a guide roll 17 is carried at the outer ends of a pair of arms 68 (only one being shown), which are pivotally mounted on the frame 12 by means of a shaft 69, which shaft also carried the guide roll 16. For web thread-up, the guide roll 17 may be swung manually from the "down" position, best seen in FIG. 4, to a position above roll 16, designated 17'. A locking means (not shown) permits the arms to be secured in either position.

Belt Conveyor

Referring now to FIGS. 1, 3 and 4, the belt conveyor 24, is illustrated. It is not needed for the invention but is depicted for information only. It comprises a plurality of toothed timing belt pulleys 70 secured to a common shaft 72 supported by the machine frame. The axis of the pulleys 70 is located at about 175° relative to roll 34 and their perimeters are spaced closed to the outside periphery of the shell 22 encircling the roll 34. For reference purposes, 0° will be taken as along the vertical line 61 (FIG. 4). Spaced horizontally from roll 70 is another set of timing belt pulleys 71 secured on a common shaft 79, also supported by the machine frame. The shaft 79 extends to the inboard side of the frame 12 and carries a toothed pulley 73, shown in FIGS. 2 and 3, which is arranged to be driven by means of a belt and a gear train hereinafter described. Located about centrally between the pulleys 70, 71, inside the lower reach of endless belts 74 wrapped thereabout is a plurality of belt tensioner pulleys 75 (FIG. 4) each of which is mounted on a short swing arm (not shown), being adapted to urge the lower reach of each belt downward to keep the belt tight.

The belts 74 are conventional, endless, toothed timing belts, except that each has a row of perforations 76 spaced the entire perimeter of the belt about midway between the belt edges. Under the level upper reach of each belt is a vacuum box 77. The tops of all of the boxes are essentially co-planar and support the belts, and each box top is provided with a slot (not shown) which is aligned with a row of perforations 76. The slots run substantially from pulley 70 to pulley 71 since the ends of the boxes are contoured to fit close to the pulleys. A vacuum manifold 78, parallel to the pulley axes, opens into all of the boxes and extends outside the machine frame to the vacuum control 27. From the foregoing, it will be seen that if any web-form material is brought into proximity with the upper planar perimeter of the belts, e.g., at the 190° position of roll 34, the web will be drawn down firmly to the belts, by the vacuum, and will thereafter by transported by the running belts from left to right, as seen in FIG. 13. Alternatively, a drum takeoff as depicted in Nystrand et al. may be used, or for that matter no takeoff need be used.

Drive

Referring to FIG. 2, the principal parts of the drive 25 comprise mating gears 13 and 14 on shafts 10 and 11, respectively, and a toothed pulley 83 on shaft 11, which is driven by a toothed timing belt 84 from a toothed drive pulley 85 and an electric motor 86. Directly under the gear 13, and engaged therewith, is a small idler gear 87 which is mounted on a shaft which is journalled for rotation in the machine frame (not shown). The gear 87 is engaged with and drives another gear 88 keyed to a shaft 89, which is also journalled in the machine frame. The shaft 89 carries a toothed timing pulley 90, which is keyed thereto and is adapted to drive a timing belt 99, which then drives the toothed pulley 73 attached to shaft 79 thereby effecting the drive of pulleys 71 and belts 74, i.e., belt conveyor 24.

While a 1:1 ratio was described for shafts 10, 11 (and gears 13, 14) other ratios of integers can be used, e.g., 2:1. In this case, shaft 10 would make two turns for each single revolution of shaft 11 and would carry one cutting blade while shaft 11 would carry two.

Blade Geometry

Figure 5:
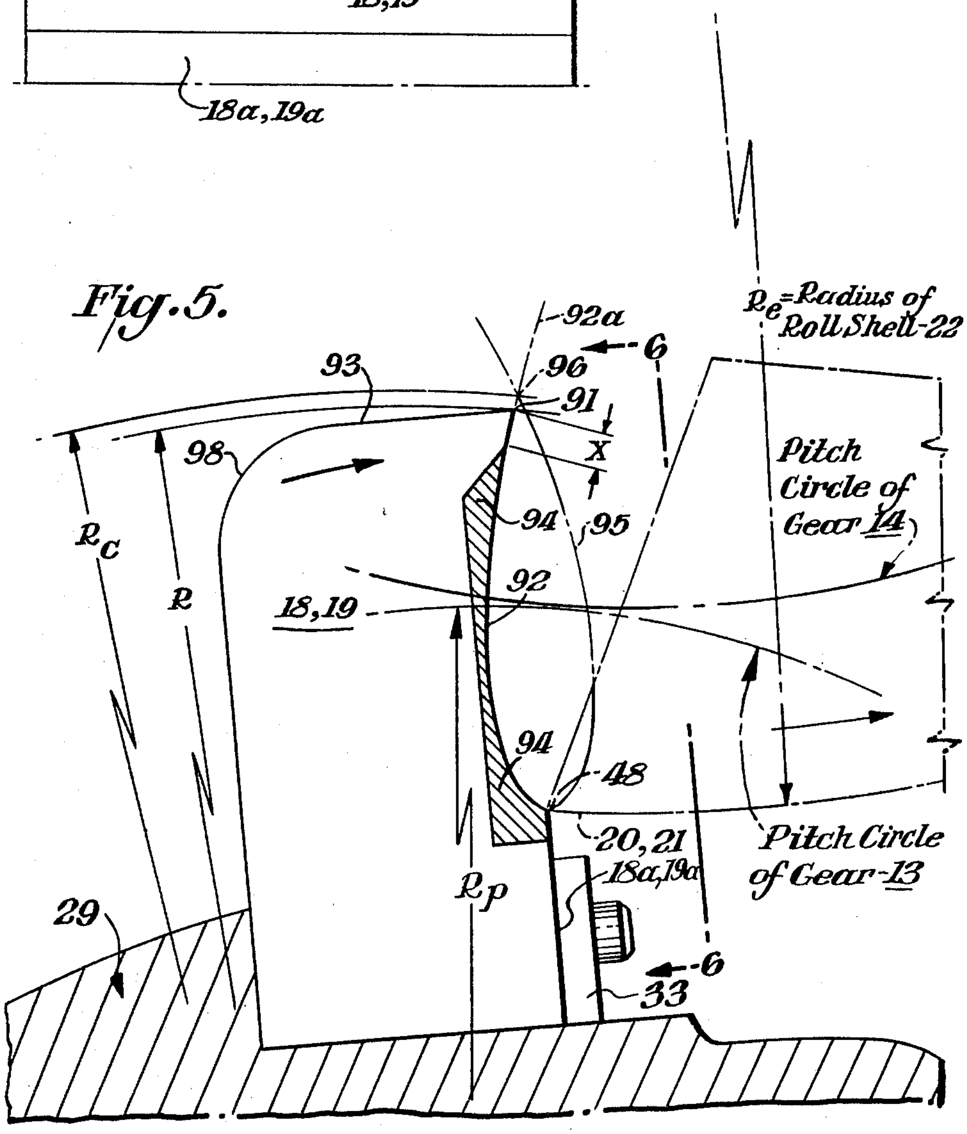
FIG. 5 is an end elevation representation of the epitrochoid blade of the apparatus of FIG. 1 showing blade contours in partially completed fabrication as well as blade contours in completed state.

In accordance with this invention, the edge 48 (FIG. 5) of blades 20 and 21 is a straight line, is located at the same radius $R_e$ (FIG. 5) as that of the roll shell 22, the edge 48 is parallel to the roll axis of rotation and the radius $R_e$ of the roll shell 22 and of the edge 48 is larger than the radius $R_p$ of the pitch circle of the gear 14 on shaft 11. On the locus blade shaft 10, for purposes of discussion, the locus blades 18 and 19 can have a generally rectangular configuration in end cross-section (FIG. 5), having planar leading faces 18*a* and 19*a* which intersect the outermost peripheral surface 93 of each blade to define a line 91 which lies in a plane encompassing the surface 93. The line 91 also lies in a radial plane (i.e., one that includes the axis of rotation of the associated shaft) and should be parallel to the shaft axis. In the embodiment illustrated in FIG. 5 the line 91 is a straight line since it is parallel to the axis of the shaft 10. The line 91 is located at a radius R greater than the radius $R_p$ of the pitch circle of the gear 13. In the event gears are not used, the relative radii of the blades may be described in terms of "equivalent" pitch circles which would be imaginary circles with radii corresponding to the pitch circles of gears if a gear were used. In addition, the outermost surface of the blade must be of a sufficiently large radius to enter the recesses 35 on the roll 34 without, however, extending so far as to strike the bottoms 35*a* of the recesses.

If a pair of confronting blades of the descirbed geometry are now brought together by rotating both the gears 14 and 13, the line 91 will be found to coincide with the edge 48 at about 18° to 20° of shaft rotation before that line and that edge are in a plane common to both the shaft axes. Further, it will be seen that, if rotation is continued, the blades will then be in interfering relationship and that, in order to permit continued rotation, one blade must cut into the other. In the embodiment described, the straight blades 20 and 21 (i.e., edges 48) are retained intact while the locus blades 18 and 19 are each swept by edge 48 as a generatrix in a curving profile 92 (locus of the generatrices) shown best in FIG. 5, which, for the described geometry, conforms to a portion of a well-known curve called an epitrochoid in the leading face 18*a*, 19*a* of each locus blade 18, 19, respectively. The edge 48 of each straight blade 20, 21 reaches a terminal position relative to the locus blades 18, 19 shown by the broken line representation of straight blades 20, 21 in FIG. 5, which occurs at 0° of shaft rotation when point 96 and edge 48 reach the plane common to both of the shaft axes. Thereafter, continued shaft rotation in the same direction to and through that plane results in the generation by edge 48 (in space) of the remainder of the path 95 of the epitrochoid from which it will be seen that the blades lose contact with each other. It will be noted that the path 95 folds back upon the starting path or profile 92*a* until it intersects it at point 96 at a radius $R_c$ having its origin on the axis (not shown) of the lower shaft 10. This point 96 and this radius $R_c$ are important, since R, the radius of the edge 91 of blades 18, 19 must not be permitted to exceed $R_c$ because, if it did, the blades 18, 19 and 20, 21 would then interfere with each other at about 25° to 30° of shaft rotation beyond the position shown in FIG. 5 and the apparatus would be inoperable. Preferably, R should be slightly less than $R_c$.

As a practical matter, the shaped epitrochoid surface depicted by profile 92 is not generated on a web cutter apparatus as described herein but rather is machined and ground into tool steel metal blanks by conventional and well-known techniques, after which the machined blades 18, 19 may be secured to body 29 of shaft 10 by means of the screws 33.

When the shaft 10 and locus blades 18, 19 having the epitrochoid surface 92 is rotated relative to the upper shaft 11, the edge 48 of a straight blade will be seen to meet line-to-line with the line 91 of the locus blade simultaneously across the entire face.

Figure 6:
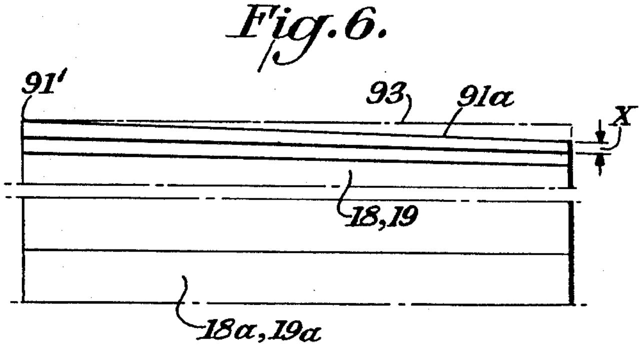
FIG. 6 is a front elevation view somewhat reduced in scale taken along the line 6—6 of FIG. 5.

In an alternative and preferred embodiment, a shear or progressive cut is made to avoid a sudden loading of the apparatus. This is accomplished by tapering the outer surface 93 at a shallow angle (e.g., 1°) across the blade as shown in FIG. 6, which then will effect progressive transverse severing of a web therebetween. Such tapering will, of course, remove the line 91 (save for a very short section at the starting end 91'), or, stated differently, will displace the line or edge 91 downward (in FIG. 6) along the shaped or curving epitrochoidal surface progressively across the blade at the 1° angle creating a new edge 91*a* (FIG. 6) which, when it coacts with edge 48, is one of the two essential cutting edges. The edge 91*a* is no longer a straight line but rather is a curved line angling across the shaped epitrochoid surface. It will be realized, when the blades coact, that the edge 48 will "wipe" the epitrochoidal surface with greater or lesser severity. Such wiping, or rubbing, may be beneficial and self-sharpen the edge 91*a* if the contact area of the edge 48 with the surface 92 is controlled. This is accomplished by machining a relief 94 to reduce the shaped epitrochoid surface to a relatively narrow finite width "X" across the entire blade generally parallel to edge 91*a*.

Operation

Web-form material in a continuous length is fed (e.g., from a roll, not shown) from the left as viewed in FIGS. 1 and 4 and is threaded up manually. Vacuum is supplied to the upper roll 34 and the belt conveyor 24 by the control 27 while the movable web guide roll 17 is swung on its arms 68 to the position 17', where it is held momentarily during threading. After threading, the roll 17' is swung down out of its normal position depicted by the solid lines. Finally, the electrical circuit to motor 86 is closed, starting the entire power train and rolls in motion. As the web is advanced counterclockwise around the roll 34, it reaches a point measured counterclockwise from the vertical line 61 (FIG. 4) of about 98° to 108° where the coacting blades sever it. Since the web is secured firmly in non-slip relation to the upper roll 34 for more than 180° of wrap by means of vacuum or other means, and since, in that situation, the web is contiguous with the perimeter of one of the straight-edged blades 20, 21 the edges 48 of which are each aligned parallel to the roll axis, it is clear that the web is severed perpendicularly to its edge.

The vacuum manifold and control 27 applies vacuum to manifold 51 starting at 95° counterclockwise and continuing to about 170° counterclockwise. Since the plane containing the roll axes is at about 116° from line 61 (FIG. 4) and severing starts about 18° in advance of that, it is clear that severing starts at about 98°, or only a few degrees after vacuum was applied to manifold 51. Thus, just prior to being severed, the unsupported span of the web extending across the open recess 35, save for minor air leakage around the two edges of the web, is subjected to a vacuum which has the effect of bowing the web slightly into the recess in a manner similar to that described by the Trogan patent.

The progressive events of FIGS. 8*a* to 8*f* for simplicity of illustration are referred not to the line 61 of FIG. 4, but angularly to the plane containing the roll axes, i.e., the zero degree reference of FIG. 8*e*. Referring to these figures, as the blade edges start to engage, say at the near end, the outer surface 93 of the lower blade 18 (also at the near end) will have started to press against the face of the web, thrusting the newly cut leading end toward the recess 35. This bends part of the leading end of the web into abutment with some of the holes 52 at the surface of the quarter-round member 43, in permitting vacuum manifold 51 to "grasp" the web. This action continues progressively across the full web width as severing proceeds and has the further effect, when severing is completed, of drawing the entire web leading end well into the recess 35 by ending it partly around the radiused convexity of the quarter-round, the effect being enhanced as the bent web approaches the second row of holes 53 in the quarter-round, which are also subjected to vacuum.

As severing of the web is completed (refer FIGS. 8*c* and 8*d*), the lower blade 18 penetrates more deeply into the recess 35, reaching maximum penetration when the blade edges 48 and 91 are in the common plane of the shaft axes, FIG. 8*e*. At this stage, despite the fact that the web end has been drawn deeply into the recess 35, the blade outer surface 93 again comes into contact with the web face. However, this contact occurs only in the narrow portion of the web nearest the cut edge. Thus, if scratching of the web or other damage occurs due to this contact, it is in an area of the web not likely to be of use in any event and is confined to a very narrow band. The rubbing effect is further minimized by providing a radius 98 on the heel or trailing side of the blades 18, 19 so that the contact nearly becomes a rolling action. As rotation of the shafts continues, FIG. 8*f*, the locus blade 18 starts to withdraw from the recess 35, losing contact with the web end once again. The web leading end remains bent into the recess under the influence of the vacuum in manifold 51 until the center line (not shown) of the manifold 51 reaches 170° counterclockwise (from line 61) at which point the vacuum therein is relieved by the control 27.

Without continued shaft rotation, control 27 produces air pressure to create jet streams discharging from the holes 52 and 53 which lift the leading web end until, at about 192° counterclockwise, the severed edge projects from the outer surface 45 of the blades 20, 21. At the same time, vacuum in grooves 36 may be relieved progressively such that the web is deflected into a generally horizontal path and thus into contact with the horizontal reach of the belts 74. Here the vacuum of boxes 77 is able to act, through perforations 76, to hold the web tightly in engagement with the running belts, which then transport the cut web out of the apparatus and into another, such as a cut sheet stacker, not shown.

The described apparatus was tested in the continuous cutting of a polyester (i.e., polyethylene terephthalate) web 0.018 cm. thick supplied at a running web speed of 100m/min. and was found to produce a high accuracy square cut, particularly as regarded consistent product length, with trouble-free sustained operation.

Alternative Embodiments

In alternative embodiments of the invention, it should be noted that the shaped cutting edge 91 may have any particular configuration so long as it is formed along the shaped epitrochoid surface 92. Thus it may have an outer surface 91*b*, as particularly depicted in FIG. 7. The undulating surface depicted has the advantage of simultaneously providing multiple shear type cuts. In fact, the surface 91*b* to some extent depicts the surface 91*a* (FIG. 6) somewhat exaggerated after several sharpenings.

Figure 12:
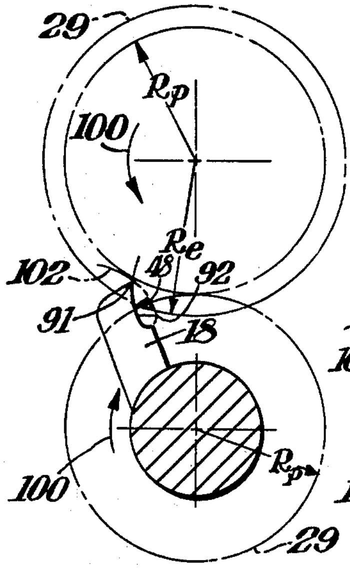
FIGS. 10 through 12 are diagrammatic representations of three different blade configurations in which the radius of the straight cutting edge, relative to the pitch radius, of its mounting shaft is equal to, less than and more than the pitch radius, representing three different configurations that may be used in the apparatus of this invention.

The preferred embodiment of the invention just described is one in which the cutting edge of the straight blade 20 on the roll 34 is a straight edge parallel to the axis of the shaft 11. The locus blade 18 is one having a shaped epitrochoid surface 92 which together with the outer peripheral surface 93 forms a cutting edge 91. In the preferred embodiment described, it was noted that the straight cutting edge 48 (FIG. 9) is located at a radial distance $R_c$ (FIG. 12) which is greater than the pitch circle $R_p$ of the gear 14 drive in the roll 34 (or equivalent pitch circle if no gear is used). Under these conditions, the shafts counter rotate respectively in the direction depicted by the arrows 100. The interacting blades edges 48, 91 trace an epitrochoid curve 102. It is for this reason that the shaped surface 92 is configured as described. This particular relationship $R_e > R_p$ has the many advantages noted.

Figure 11:
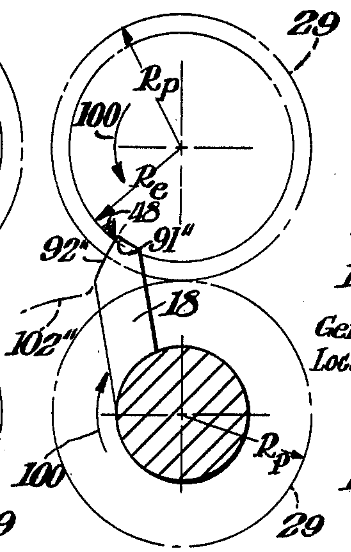
Figure 10:
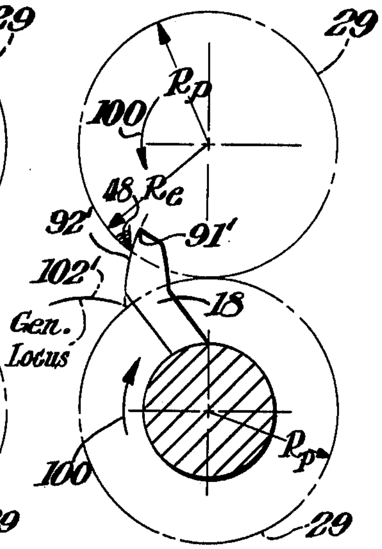

In other embodiments of the invention, as depicted in FIGS. 10 and 11, the radiuses $R_e$ and $R_p$ are varied. Thus in the embodiment depicted in FIG. 10, the radius $R_e$ of the straight line cutting edge 48' is made equal to that of its (equivalent) pitch circle $R_p$. In this instance, the epitrochoid curve traced by the relative movement between the blade edges 48' and 91' is depicted by the curve 102' which is the epitrochoid curve formed when $R_e$ equals $R_p$. Accordingly, the shaped surface 92' in this instance is a convex surface in profile following that portion of the epitrochoid curve 102'.

In the final embodiment of the invention, the radius $R_e$ of the straight cutting edge 48" may be less than that of the (equivalent) pitch radius $R_p$ of the gear driving that particular shaft which mounts the straight edge cutting blade. This is depicted in FIG. 11 wherein all of the comparable parts have been given a double prime ("). In this instance, the epitrochoid curve 102" traced is somewhat flatter than that heretofore experienced necessitating the shaped surface 92" which is still of a convex nature of the type described in connection with the embodiment of FIG. 10. It may be noted that for the embodiments illustrated in FIGS. 10 and 11 the straight blade edges 48', 48" are faced in the direction of rotation to engage the shaped surfaces 92', 92". The straight blade edge 48 (FIG. 12) faces oppositely to the direction of rotation to engage the shaped surface 92.

All of these various embodiments have many of the same advantages described in connection with the preferred embodiment of the invention. When wrapping the web around the roll 34 and retaining the web against the roll, accurate metering of the length is achieved. The knife, when the shaped blade is tapered, achieves a progressive cut which is square even when cutting relatively tough plastic materials. The blades tend to be self-sharpening in that the straight edge blade will tend to sharpen the somewhat softer shaped blade. Nicks occuring in the blade are easily removed and, furthermore, when the sharpening is accomplished by grinding down the outer peripheral surface 93 of the shaped blade, little or no readjustment is required since the shaped epitrochoid surface 92 remains untouched. Hence, so long as the surface 92 is properly shaped with the generatrices of the surface being parallel to their shaft axis and having an epitrochoid locus and the straight blade edge 48 parallel to the axis of its shaft, a proper cut is assured with little down time.

I claim:

1. A cutter for a running web comprising:

first and second axially co-parallel counter-rotating shafts driven in synchronism one with the other, a first blade mounted on said first shaft and having a straight cutting edge parallel to the axis thereof, a second blade mounted on said second shaft and having a shaped surface defined by generatrices parallel to the axis of said second shaft with the locus of said generatrices being an epitrochoid, said second blade having an outer peripheral surface forming with said shaped surface a second cutting edge, and said blades co-acting along their opposed cutting edges to effect a cut on a web therebetween.

2. A cutter according to claim 1 wherein said second cutting edge is non-parallel to said second shaft axis.

3. A cutter according to claim 1 wherein each of said shafts have an equivalent pitch radius and the radial distance of said first blade cutting edge from said first shaft axis is equal to or less than said equivalent pitch radius of said first shaft.

4. A cutter according to claim 1 wherein each of said shafts have an equivalent pitch radius and the radial distance of said first blade cutting edge from said first shaft axis is greater than said equivalent pitch radius of said first shaft.

5. A cutter according to claim 4 wherein said first shaft defines at least one peripheral axially extending recess, said first blade being mounted in said recess with its said cutting edge located near the outside periphery of said first shaft.

6. A cutter according to claim 5 which also includes a retention means for selectively retaining a web on a portion of the periphery of said first shaft at least to the point of web severance.

7. A cutter according to claim 6 wherein said retention means includes a plurality of vacuum retaining ports in the periphery of said first shaft, and said retention means is adapted to selectively apply vacuum to said ports.

8. A cutter according to claim 6 wherein said second blade outer peripheral surface contiguous with said cutting edge is tapered along its full length relative to said shaft axis.

9. A cutter according to claim 6 wherein said second blade cutting edge is located at a radius greater than said equivalent pitch radius of said second shaft.

10. A cutter according to claim 6 wherein said second blade cutting edge lies in a plane.

11. A cutter according to claim 3 wherein said first shaft defines at least one peripheral axially extending recess, said first blade being mounted in said recess with its said cutting edge located near the outside periphery of said first shaft.

12. A cutter according to claim 11 which also includes a retention means for selectively retaining a web on a portion of the periphery of said first shaft at least to the point of web severance.

13. A cutter according to claim 2 which also includes a retention means for selectively retaining a web on a portion of the periphery of said first shaft at least to the point of web severance.

14. A shear cutter for a running web comprising: a pair of axially co-parallel counter-rotating shafts power-driven in synchronism one with the other, the first shaft of said pair being provided over a major expanse of its periphery with a multiplicity of web-retaining vacuum ports and at least one peripheral inwardly extending recess within which is mounted a radially disposed straight-edge blade having a cutting edge located near the outside perimeter of said first shaft parallel to the axis thereof, the second shaft of said pair being provided with at least one peripheral inwardly extending recess within which is mounted a blade having a cutting edge located outboard of said shaft shaped in end cross-section over its full length to a generally epitrochoidal curve, said blades interacting along their opposed cutting edges to effect a shearing cut on a web trained over the periphery of said first shaft during a predetermined angular sweep of said shafts when said blades are in proximity one to the other, control means operating in a predetermined time sequence relative to the rotation of said shafts repetitively imposing preselected time durations for vacuum web retention, web end deflection and web stripping cycles of said shear cutter operation, and means responsive to said control means effecting in seriatim, vacuum web retention, vacuum deflection and retention of the leading edge of said web after each cut is completed followed by means stripping said leading edge at a preselected delivery point for severed sheets of said web.

15. A shear cutter for a running web according to claim 14 wherein said means for effecting, in seriatim, vacuum deflection and retention of the leading edge of said web after successive cuts are completed followed by stripping of said leading edge at a preselected delivery point for severed sheets of said web is disposed within said peripheral inwardly extending recess of said first shaft rearwardly of and in close proximity to said straight-edge blade.

16. A shear cutter for a running web according to claim 15 wherein said shafts are provided with a multiplicity of pairs of peripherally spaced co-acting web cutting blades.

17. A shear cutter for a running web according to claim 14 in which said counter-rotating shafts are disposed generally horizontally, with said first shaft of said pair located above said second shaft and laterally spaced therefrom a sufficient distance to preclude interference during said interaction of said blades.

18. A shear cutter for a running web according to claim 15 in which said control means additionally comprises means relieving said vacuum proximal to said leading edge following said shearing cut.

19. A shear cutter according to claim 14 wherein said blade shaped in end cross-section over its full length to a generally epitrochoidal curve has a shaped expanse in the range of about 0.10 cm to about 40% of the generally radial extent of blade maximum overlap during said blade interaction.

20. A shear cutter for a running web according to claim 14 wherein said blade shaped in end cross-section over its full length to a generally epitrochoidal curve has an outer surface contiguous with said cutting edge tapered along its full length relative to said shaft axis.

* * * * *